US008897750B2

(12) United States Patent
Rogers (10) Patent No.: US 8,897,750 B2
(45) Date of Patent: Nov. 25, 2014

(54) RECOVERY FROM ABORTED INTEGRITY PROTECTION CHANGE (71) Applicant: NVIDIA Corporation, Santa Clara, CA (US)

(72) Inventor: Tim Rogers, Essex (GB)

(73) Assignee: NVIDIA Corporation, Santa Clara, CA (US)

( * ) Notice: Subject to any disclaimer, the term of this patent is extended or adjusted under 35 U.S.C. 154(b) by 117 days.

(21) Appl. No.: 13/857,777

(22) Filed: Apr. 5, 2013

(65) Prior Publication Data

US 2014/0302815 A1 Oct. 9, 2014

(51) Int. Cl.
*H04M 1/66* (2006.01)
*H04W 12/10* (2009.01)
*H04W 24/02* (2009.01)

(52) U.S. Cl.
CPC .............. *H04W 12/10* (2013.01); *H04W 24/02* (2013.01)
USPC ........................................................ 455/410

(58) Field of Classification Search
USPC .................................................. 455/410–411
See application file for complete search history.

(56) References Cited

U.S. PATENT DOCUMENTS

2003/0100291 A1* 5/2003 Krishnarajah et al. ........ 455/410
2005/0276417 A1* 12/2005 Funnell ......................... 380/270
2012/0252406 A1* 10/2012 Martin et al. ................. 455/410
2012/0275340 A1* 11/2012 McGann ....................... 370/254

OTHER PUBLICATIONS

3GPP TS 25.331 v11.4.0 (Dec. 2012) 3rd Generation Partnership Project; Technical Specification Group Radio Access Network; Radio Resource Control (RRC); Protocol Specification (Release 11), http://www.qtc.jp/3GPP/Specs/25331-b40.pdf.*

* cited by examiner

*Primary Examiner* — Brandon Miller (57) ABSTRACT

A method, in a wireless communications device, comprising: receiving a new security mode configuration from a radio access network that is to replace an original security mode configuration as part of a security procedure; detecting, prior to completion of said security procedure, that a cell update message is to be sent to the network; transmitting a first cell update message to the network in accordance with the original security mode configuration; transmitting a second cell update message to the network in accordance with the new security mode configuration; receiving a cell update confirm message, the cell update confirm message sent by the network in accordance with a network determined security mode configuration; ascertaining if the network determined security mode configuration is either the original or new security mode configuration; and completing the cell update procedure in accordance with the ascertained security mode configuration.

33 Claims, 8 Drawing Sheets

RECOVERY FROM ABORTED INTEGRITY PROTECTION CHANGE

BACKGROUND

In a communication system, a device (typically a mobile device) termed user equipment (UE) communicates wirelessly with a radio access network. Communications between the UE and the radio access network are effected in accordance with a multi-layered communications protocol.

Figure 1:
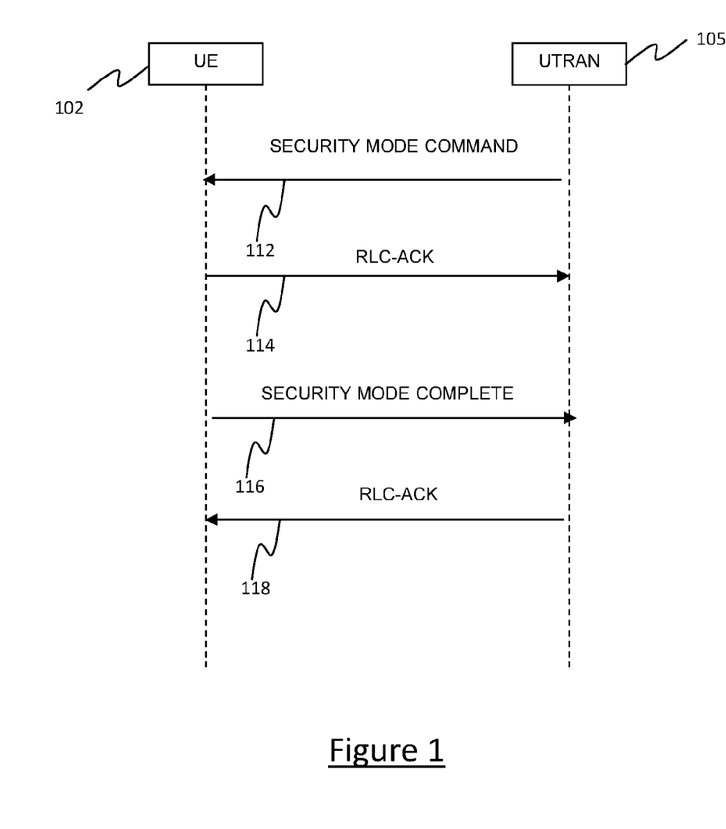
FIG. 1 shows a security procedure.

The 3GPP 25.331 specification classifies a Security Mode Command procedure shown in FIG. 1 between the UE 102 and the radio access network 105.

The security consists of two aspects, optional ciphering and mandatory integrity protection. Ciphering provides encryption according to a ciphering configuration to ensure that all signaling and data messages transmitted between the UE and the radio access network are ciphered over the air interface to provide data confidentiality. Integrity protection provides protection against message manipulation between the UE and the radio access network. That is, integrity protection prevents third parties from sending unauthorised signaling messages between the UE and radio access network. Typically, both ciphering and integrity protection are enabled during a call.

As part of the Security Mode Command procedure the radio access network sends a Security Mode Command 112 using the Radio Resource Control (RRC) protocol to the UE with an indication of a new integrity protection configuration and new cipher configuration. In response to the Security Mode Command, the UE sends an acknowledgement message 114 to the radio access network and subsequently sends a RRC Security Mode Complete message 116 to the radio access network. In response to receiving the Security Mode Complete message from the UE, the radio access network sends an acknowledgement message 118 to the UE.

The 3GPP 25.331 specification mandates a specific method to handle a cell update procedure during the security mode command procedure. This method is to abort the new integrity protection configuration and new cipher configuration, and continue with the original integrity protection configuration and cipher configuration (used prior to initiation of the security mode command procedure).

This is problematic because the Security Mode Command procedure terminates at different times in the UE and the radio access network, which can lead to the abortion of the Security Mode Command procedure in the UE but not in the radio access network. In particular, the radio access network terminates the Security Mode Command procedure when it sends the acknowledgement 118 to the UE after receipt of the Security Mode Complete message. In contrast, the UE terminates the Security Mode Command procedure when it receives the acknowledgement 118 for the Security Mode Complete message from the radio access network. The transmission of the acknowledgement 118 for the Security Mode Complete message from the radio access network to the UE is not completely reliable and therefore may not be received by the UE.

When the UE performs a Cell Update whilst the UE is waiting for the acknowledgement for the Security Mode Complete message from the radio access network, the UE aborts the Security Mode Command procedure; however the radio access network does not abort the Security Mode Command procedure.

If the UE and radio access network do not abort the Security Mode Command procedure simultaneously, ciphering and integrity protection configuration will be not be the same in the UE and the radio access network which leads to the RRC connection to be lost.

This issue has been addressed in 3GPP 25.331 specification release 10, where it requires updated functions in UE and the radio access network. In the 3GPP method the Security Mode Command procedure is allowed to be completed early if the UE successfully integrity checks an RRC message received on SRB3 using integrity check parameters from the Security Mode Command. This may reduce the time the problem can occur, but does not address the problem described above. In the 3GPP method the UE can signal to the radio access network in the Cell Update message if the Security Mode Command procedure was aborted. Because the Cell Update message is not ciphered, the radio access network can receive and process the Cell Update message and then align its security configuration for the UE, to that indicated. The Change Requests that introduce and subsequently correct this method are 4427 (November 2010), 4583 (May 2011), and 4884 (November 2011) all applying to the 3GPP 25.331 specification.

SUMMARY

According to a first aspect of the invention there is provided a method, in a wireless communications device, of implementing a cell update procedure during a security mode configuration procedure, the method comprising: receiving a new security mode configuration from a radio access network that is to replace an original security mode configuration as part of said security mode configuration procedure; detecting, prior to completion of said security mode configuration procedure, that a cell update message is to be sent to the radio access network; transmitting a first cell update message to the radio access network in accordance with the original security mode configuration; transmitting a second cell update message to the radio access network in accordance with the new security mode configuration; receiving a cell update confirm message from the radio access network, the cell update confirm message sent by the radio access network in accordance with a network determined security mode configuration; ascertaining if the network determined security mode configuration is either the original security mode configuration or the new security mode configuration; and completing the cell update procedure in accordance with the ascertained security mode configuration.

According to another aspect of the invention there is provided a wireless communications device arranged to implement a cell update procedure during a security mode configuration procedure, the wireless communications device comprising: a transceiver arranged to receive a new security mode configuration from a radio access network that is to replace an original security mode configuration as part of the security mode configuration procedure; a central processing unit; a memory coupled to the central processing unit, the memory containing program code executable by the central processing unit causing the central processing unit to perform the following steps: detect, prior to completion of said security mode configuration procedure, that a cell update message is to be sent to the radio access network; transmit a first cell update message to the radio access network in accordance with the original security mode configuration; transmit a second cell update message to the radio access network in accordance with the new security mode configuration; receive a cell update confirm message from the radio access network, the cell update confirm message sent by the radio access network in accordance with a network determined security mode configuration; ascertain if the network determined security mode configuration is either the original security mode configuration or the new security mode configuration; and complete the cell update procedure in accordance with the ascertained security mode configuration.

According to another aspect of the invention there is provided a method, in a wireless communications device, of implementing a cell update procedure during a security mode configuration procedure, the method comprising: receiving a new security mode configuration from a radio access network that is to replace an original security mode configuration as part of said security mode configuration procedure; detecting, prior to completion of said security mode configuration procedure, that a cell update message is to be sent to the radio access network; transmitting a first cell update message to the radio access network in accordance with a first security mode configuration; determining if a cell update confirm message is received from the radio access network on one of a first and second signalling radio bearer in accordance with a network determined security mode configuration within a predetermined time period from transmission of said first cell update message, wherein if a cell update confirm message is received within said predetermined time period, the method further comprising: attempting to decipher the received cell update confirm message using the first security mode configuration, or attempting to verify the integrity of the received cell update confirm message using the first security mode configuration, based on the signalling radio bearer on which the cell update confirm message is received; wherein in the event of failure of the attempted decipher or the integrity verification, the method further comprising: transmitting a second cell update message to the radio access network in accordance with a second security mode configuration.

According to another aspect of the invention there is provided a wireless communications device arranged to implement a cell update procedure during a security mode configuration procedure, the wireless communications device comprising: a transceiver arranged to receive a new security mode configuration from a radio access network that is to replace an original security mode configuration as part of the security mode configuration procedure; a central processing unit; a memory coupled to the central processing unit, the memory containing program code executable by the central processing unit causing the central processing unit to perform the following steps: detect, prior to completion of said security mode configuration procedure, that a cell update message is to be sent to the radio access network; transmit a first cell update message to the radio access network in accordance with a first security mode configuration; determine if a cell update confirm message is received from the radio access network on one of a first and second signalling radio bearer in accordance with a network determined security mode configuration within a predetermined time period from transmission of said first cell update message, wherein if a cell update confirm message is received within said predetermined time period, the central processing unit arranged to: attempt to decipher the received cell update confirm message using the first security mode configuration, or attempt to verify the integrity of the received cell update confirm message using the first security mode configuration, based on the signalling radio bearer on which the cell update confirm message is received; and in the event of failure of the attempted decipher or the integrity verification, transmit a second cell update message to the radio access network in accordance with a second security mode configuration.

BRIEF DESCRIPTION OF THE DRAWINGS

For a better understanding of the present invention and to show how the same may be put into effect, reference will now be made, by way of example, to the following drawings in which.

DETAILED DESCRIPTION

According to a first aspect of the invention there is provided a method, in a wireless communications device, of implementing a cell update procedure during a security mode configuration procedure, the method comprising: receiving a new security mode configuration from a radio access network that is to replace an original security mode configuration as part of said security mode configuration procedure; detecting, prior to completion of said security mode configuration procedure, that a cell update message is to be sent to the radio access network; transmitting a first cell update message to the radio access network in accordance with the original security mode configuration; transmitting a second cell update message to the radio access network in accordance with the new security mode configuration; receiving a cell update confirm message from the radio access network, the cell update confirm message sent by the radio access network in accordance with a network determined security mode configuration; ascertaining if the network determined security mode configuration is either the original security mode configuration or the new security mode configuration; and completing the cell update procedure in accordance with the ascertained security mode configuration.

The new security mode configuration may comprise a new integrity algorithm; and the original security mode configuration may comprise an original integrity algorithm. The new security mode configuration may additionally comprise a new ciphering algorithm, and the original security mode configuration may additionally comprise an original ciphering algorithm, The method may further comprise: testing the integrity of the received cell update confirm message using the original integrity algorithm; testing the integrity of the received cell update confirm message using the new integrity algorithm; and ascertaining the network determined security mode configuration based on one of the integrity tests being successful.

The wireless communications device may communicate with the radio access network in accordance with a multi-layered communication protocol, the integrity testing performed at a Radio Resource Control (RRC) layer of the multi-layered communication protocol The method may further comprise: deciphering the received cell update confirm message using the original ciphering algorithm and testing the integrity of the received cell update confirm message using the original integrity algorithm; and deciphering the received cell update confirm message using the new ciphering algorithm and testing the integrity of the received cell update confirm message using the new integrity algorithm; and ascertaining the network determined security mode configuration based on one of the integrity tests being successful.

The wireless communications device may communicate with the radio access network in accordance with a multi-layered communication protocol, the deciphering being performed at a Radio Link Control (RLC) layer or a Medium Access Control (MAC) layer of the multi-layered communication protocol in dependence on a mode of operation of the wireless communications device, and the integrity testing being performed at a Radio Resource Control (RRC) layer of the multi-layered communication protocol.

The first cell update message may be transmitted to the radio access network in accordance with the original integrity algorithm; and the second cell update message may be transmitted to the radio access network in accordance with the new integrity algorithm.

The cell update procedure may be completed by transmitting a UTRAN Mobility Information Confirm message to the radio access network in accordance with the ascertained security mode configuration.

In some embodiments, the contents of the first cell update message and a second cell update message are identical.

In other embodiments, the contents of the first cell update message and a second cell update message are different. That is, the first cell update message may comprise measurement result information different to that included in the second cell update message.

The security mode configuration procedure may be implemented according to the Radio Resource Control (RRC) security mode configuration procedure. The new security mode configuration may be received from a radio access network in the form of a security mode command message.

The security mode configuration procedure may be aborted in response to transmitting the first cell update message to the radio access network.

According to another aspect of the invention there is provided a wireless communications device arranged to implement a cell update procedure during a security mode configuration procedure, the wireless communications device comprising: a transceiver arranged to receive a new security mode configuration from a radio access network that is to replace an original security mode configuration as part of the security mode configuration procedure; a central processing unit; a memory coupled to the central processing unit, the memory containing program code executable by the central processing unit causing the central processing unit to perform the following steps: detect, prior to completion of said security mode configuration procedure, that a cell update message is to be sent to the radio access network; transmit a first cell update message to the radio access network in accordance with the original security mode configuration; transmit a second cell update message to the radio access network in accordance with the new security mode configuration; receive a cell update confirm message from the radio access network, the cell update confirm message sent by the radio access network in accordance with a network determined security mode configuration; ascertain if the network determined security mode configuration is either the original security mode configuration or the new security mode configuration; and complete the cell update procedure in accordance with the ascertained security mode configuration.

According to another aspect of the invention there is provided a method, in a wireless communications device, of implementing a cell update procedure during a security mode configuration procedure, the method comprising: receiving a new security mode configuration from a radio access network that is to replace an original security mode configuration as part of said security mode configuration procedure; detecting, prior to completion of said security mode configuration procedure, that a cell update message is to be sent to the radio access network; transmitting a first cell update message to the radio access network in accordance with a first security mode configuration; determining if a cell update confirm message is received from the radio access network on one of a first and second signalling radio bearer in accordance with a network determined security mode configuration within a predetermined time period from transmission of said first cell update message, wherein if a cell update confirm message is received within said predetermined time period, the method further comprising: attempting to decipher the received cell update confirm message using the first security mode configuration, or attempting to verify the integrity of the received cell update confirm message using the first security mode configuration, based on the signalling radio bearer on which the cell update confirm message is received; wherein in the event of failure of the attempted decipher or the integrity verification, the method further comprising: transmitting a second cell update message to the radio access network in accordance with a second security mode configuration.

The method may further comprise attempting to verify the integrity of the received cell update confirm message using the first security mode configuration if the first signalling radio bearer received the cell update confirm message.

The first security mode configuration may comprise an original integrity algorithm; and the second security mode configuration may comprise a new integrity algorithm. Alternatively, the first security mode configuration may comprise a new integrity algorithm; and the second security mode configuration may comprise an original integrity algorithm.

The method may comprise attempting to decipher the received cell update confirm message using the first security mode configuration if the second signalling radio bearer received the cell update confirm message.

The first security mode configuration may comprise an original ciphering algorithm, and the second security mode configuration may comprise a new ciphering algorithm, Alternatively, the first security mode configuration may comprise a new ciphering algorithm, and the second security mode configuration may comprise an original ciphering algorithm, The first signalling radio bearer may correspond to SRB0 defined in the 3GPF 25.331 technical specification and the second signalling radio bearer may correspond to SRB1 defined in the 3GPP 25.331 technical specification.

The wireless communications device may communicate with the radio access network in accordance with a multi-layered communication protocol, and the attempt to verify the integrity of the received cell update confirm message may be performed at a Radio Resource Control (RRC) layer of the multi-layered communication protocol The wireless communications device may communicate with the radio access network in accordance with a multi-layered communication protocol, and the attempt to decipher the received cell update confirm message may be performed at a Radio Link Control (RLC) layer or a Medium Access Control (MAC) layer of the multi-layered communication protocol in dependence on a mode of operation of the wireless communications device, If a cell update confirm message is not received within said predetermined time period, the method may further comprise: transmitting the second cell update message to the radio access network in accordance with the second security mode configuration.

The security mode configuration procedure may be implemented according to the Radio Resource Control (RRC) security mode configuration procedure.

The new security mode configuration may be received from the radio access network in the form of a security mode command message.

The method may further comprise aborting the security mode configuration procedure in response to transmitting the first cell update message to the radio access network.

According to another aspect of the invention there is provided a wireless communications device arranged to implement a cell update procedure during a security mode configuration procedure, the wireless communications device comprising: a transceiver arranged to receive a new security mode configuration from a radio access network that is to replace an original security mode configuration as part of the security mode configuration procedure; a central processing unit; a memory coupled to the central processing unit, the memory containing program code executable by the central processing unit causing the central processing unit to perform the following steps: detect, prior to completion of said security mode configuration procedure, that a cell update message is to be sent to the radio access network; transmit a first cell update message to the radio access network in accordance with a first security mode configuration; determine if a cell update confirm message is received from the radio access network on one of a first and second signalling radio bearer in accordance with a network determined security mode configuration within a predetermined time period from transmission of said first cell update message, wherein if a cell update confirm message is received within said predetermined time period, the central processing unit arranged to: attempt to decipher the received cell update confirm message using the first security mode configuration, or attempt to verify the integrity of the received cell update confirm message using the first security mode configuration, based on the signalling radio bearer on which the cell update confirm message is received; and in the event of failure of the attempted decipher or the integrity verification, transmit a second cell update message to the radio access network in accordance with a second security mode configuration.

According to another aspect of the invention there is provided a computer program product for implement a cell update procedure during a security mode configuration procedure at a wireless communications device, the computer program product comprising code embodied on a non-transient computer-readable medium and configured so as when executed on a processing apparatus of the wireless communications device to perform the steps of any of the methods described herein.

Embodiments of the invention will now be described by way of example only.

Figure 2:
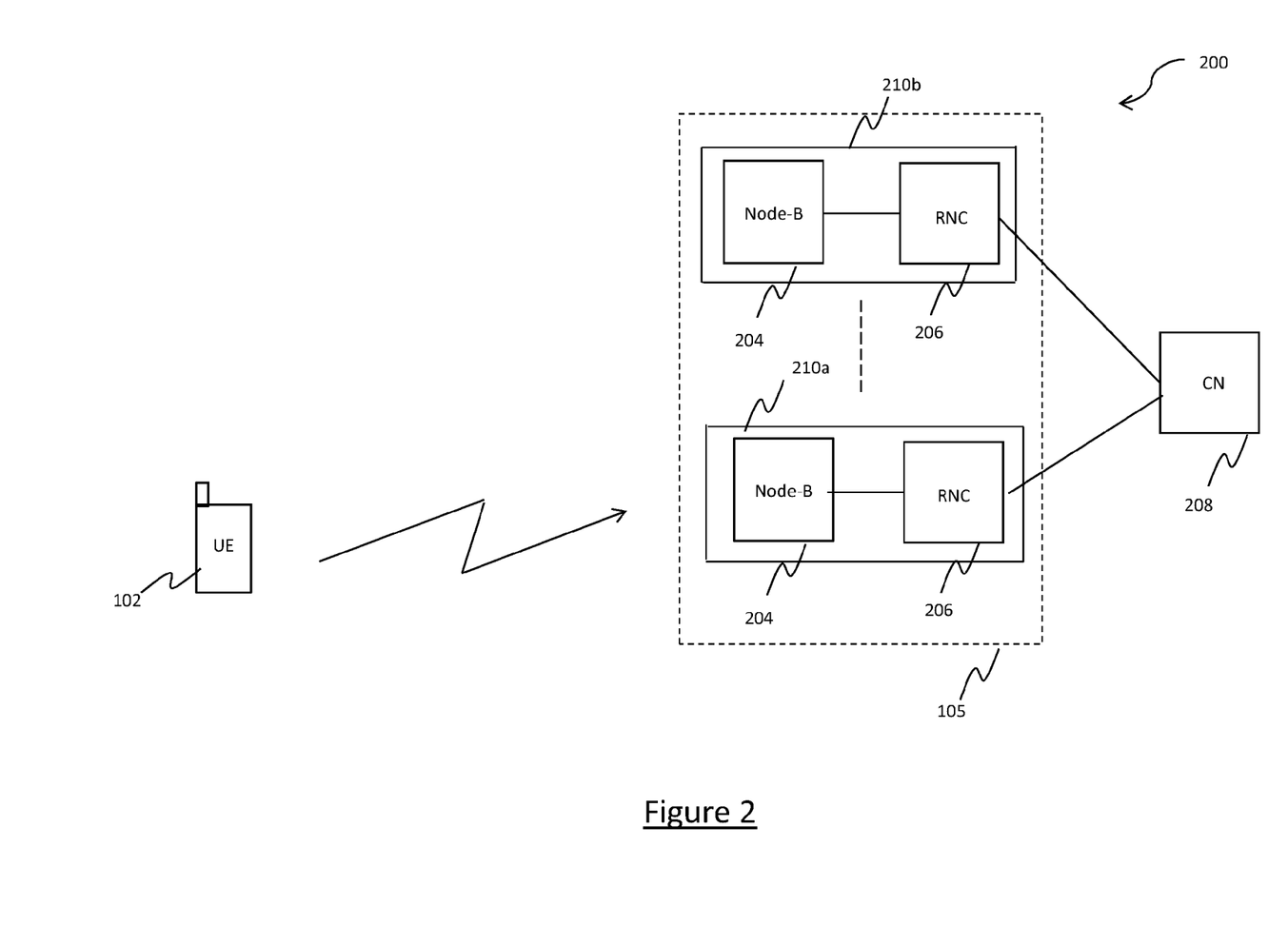
FIG. 2 shows a UMTS mobile communication system.

With reference to FIG. 2, there is illustrated the main elements of a UMTS communication system, generally denoted by reference numeral 200. It will be understood that in FIG. 2 only sufficient elements of the system are shown in order to present the context of the some arrangements of the invention.

The UMTS communication system 200 comprises a wireless communications device termed user equipment (UE) 102. The user equipment 102 may be a mobile telephone, a personal digital assistant (PDA), a computer or any other device that exchanges data wirelessly. The UE 102 is in communication with a UMTS Terrestrial Radio Access Network (UTRAN) 105. The UTRAN 105 comprises one or more radio network sub-systems 210a, 210b. A radio network sub-system is a sub-network within the UTRAN 105 and comprises a base station 204 (termed node-B) and a radio network controller (RNC) 206. A node-B 204 is a transceiver which sends and receives wireless signals and defines a cell region. A RNC 206 is the network element responsible for the control of the radio resources of the UTRAN 105. A dedicated physical channel is established between the UE 102 and the node-B 204 to allow data communication to take place there between. It will be appreciated that a plurality of UEs and radio network sub-systems may be present in the UTRAN 105, which for clarity purposes are not shown. The UTRAN 105 is in communication with a core network 208. The structure of a UMTS mobile communication system as illustrated in FIG. 2 is well-known to one skilled in the art, and the further operation of such a system is not described herein.

Figure 3:
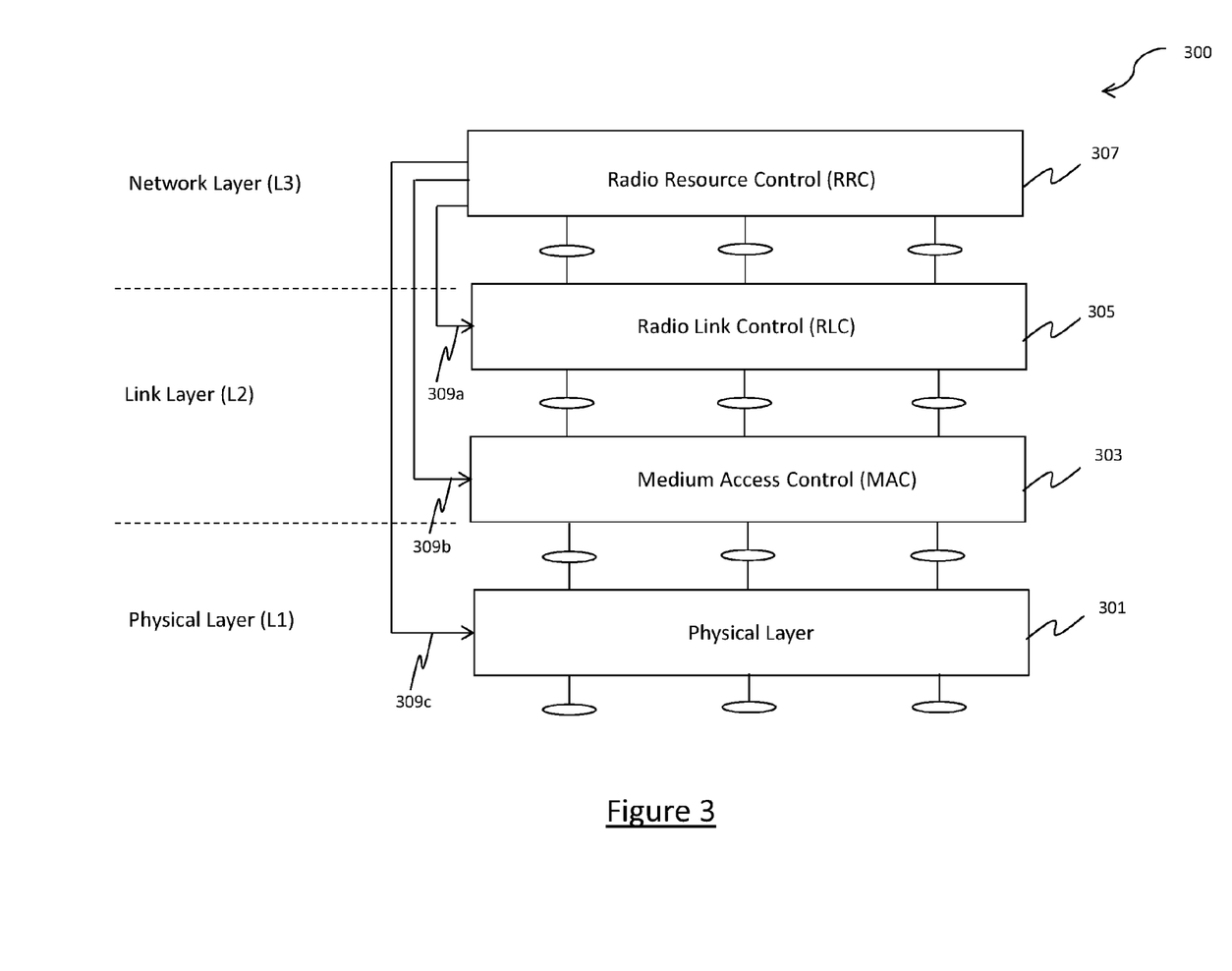
FIG. 3 shows a block diagram of a UMTS radio interface protocol architecture.

Referring to FIG. 3, there is shown a simplified block diagram of a UMTS radio interface protocol architecture 300. Communications between the UE 102 and the UTRAN 105 are effected in accordance with the multi-layered communications protocol shown in FIG. 3. The protocol architecture comprises a first layer (L1) which includes a physical layer 301, above the first layer is a second layer (L2) which includes a Medium Access Control (MAC) layer 303 and a Radio Link Control (RLC) layer 305, and above the second layer is a third layer (L3) which includes a Radio Resource Control (RRC) layer 307.

When data is transmitted from the UE 102 to the UTRAN 105, data is passed from the RLC layer 305 to the MAC layer 303 using logical channels. The logical channel defines the type of information that is transferred. These logical channels include a common control channel (CCCH) and a dedicated control channel (DCCH). The CCCH is a bidirectional channel for transmitting control information between the UE 102 and the UTRAN 105. The DCCH is a bidirectional channel for transmitting control information between the UE 102 and the UTRAN 105, wherein the control information is dedicated to the particular UE. Other logical channels are well known to the persons skilled in the art and are not described herein. In the MAC layer 303 the logical channels are mapped to transport channels. In the physical layer 301 the transport channels are mapped onto physical channels. Thus with reference to FIG. 3, it can be seen that during a data transmission from the UE 102 to the UTRAN 105 data is passed down through the layer architecture 200. Similarly, when data is received at the UE 102 from the UTRAN 105, data is passed up through the layer architecture 300.

Control interfaces 309 between the RRC layer 307 and all the lower layer protocols are used by the RRC layer 307 to configure characteristics of the lower layer protocol entities, including parameters for the physical, transport and logical channels. The control interfaces 309 are used by the RRC layer 307 to command the lower layers to perform certain types of measurement and by the lower layers to report measurement results and errors to the RRC layer 307.

The RLC layer 305 provides services to higher layers for the transfer of user and/or control data. The service provided for user data is called Radio Bearer (RB) and the service provided for control data is called Signalling Radio Bearer (SRB). A SRB is associated with a signalling radio bearer queue and a logical channel. The RLC layer 305 may comprise multiple SRB's such that each SRB is associated with a signalling radio bearer queue and a logical channel.

Referring to the Security Mode Command procedure shown in FIG. 1, after transmission of the acknowledgement 118 to the UE 102 the UTRAN 105 terminates the Security Mode Command procedure. After termination of the Security Mode Command procedure the UTRAN 105 will be arranged to use a particular integrity algorithm and ciphering algorithm for transmission and receipt of data to and from the UE 102.

Integrity protection is applied at the RRC layer 307 only. Only the signalling messages are integrity protected. The integrity protection is applied separately to each active SRB. The data radio bearers are not integrity protected. Ciphering is optional and is done for DCCH signalling as well as data radio bearers. For radio bearers using Acknowledged Mode (AM) or Unacknowledged Mode (UM) of operation, ciphering is done in the RLC layer 305. For radio bearers using Transparent Mode (TM) mode of operation, ciphering is done in the MAC layer 303. The ciphering process applies separately to each active radio bearer.

A cell update procedure may be triggered during a Security Mode Command procedure shown in FIG. 1. In particular, a cell update procedure may be triggered at a time after the UTRAN 105 has transmitted the acknowledgement 118, and when the acknowledgement 118 has not been received at the UE 102. In this case, the UE 102 may not be arranged to use the same integrity algorithm and ciphering algorithm for transmission and receipt of data to and from the UTRAN 105 that the UTRAN is arranged to use.

One embodiment for handling of a cell update procedure initiated after the UTRAN 105 has transmitted the acknowledgement 118 during the security procedure of FIG. 1 will now be described with reference to FIGS. 4a and 5a.

In step S402, a cell update procedure is triggered at the UE 102 and causes the UE 102 to abort the security procedure of FIG. 1. A cell update procedure may be triggered for a number of reasons well known to persons skilled in the art, for example cell reselection if the UE 102 is in the CELL FACH RRC state, and radio link failure if the UE 102 is in the CELL DCH RRC state.

In step S404, the UE 102 transmits a first Cell Update message to the UTRAN 105 using an original integrity algorithm. The use of the term "original" here denotes the integrity algorithm that the UE 102 was arranged to use for handling data transmissions to and from the UTRAN 105 before the UE 102 received the Security Mode Command message 112 from the UTRAN 105 with an indication of a new integrity algorithm to be used. The original integrity algorithm will output an integrity message MAC-1 (Message Authentication Code) which is appended to the Cell Update message 502a. The transmission of the first Cell Update message at step S404 is show in FIG. 5 as Cell Update message 502a. The Cell Update message 502a is sent on CCCH which is not ciphered.

In step S406, the UE 102 transmits a second Cell Update message to the UTRAN 105 using the new but aborted integrity algorithm that was received from the UTRAN 105 in the Security Mode Command message 112. The new but aborted integrity algorithm will output an integrity message MAC-1 (Message Authentication Code) which is appended to the Cell Update message 502b. The transmission of the second Cell Update message at step S406 is show in FIG. 5 as Cell Update message 502b. The Cell Update message 502b is sent on CCCH which is not ciphered.

The reference here to "first" and "second" here does not denote any particular order. That is, the Cell Update message 502b transmitted using the new but aborted integrity algorithm may be transmitted to the UTRAN 105 before the Cell Update message 502a is transmitted to the UTRAN 105 using the original integrity algorithm.

The UTRAN 105 will be able to verify the integrity of only one of the Cell Update messages. On receiving the Cell Update message 502a the UTRAN 105 is arranged to generate an expected integrity message XMAC-1 (eXpected MAC) and compare it to the MAC-1 received appended to the Cell Update message 502a. Similarly, on receiving the Cell Update message 502b the UTRAN 105 is arranged to generate an expected integrity message XMAC-1 (eXpected MAC) and compare it to the MAC-1 received appended to the Cell Update message 502b.

The UTRAN 105 will accept the Cell Update message for which the generated XMAC-1 is equal to the MAC-1 received appended to the respective Cell Update message.

The UTRAN 105 responds to the successful Cell Update message 502 by transmitting a Cell Update Confirm message 504 to the UE 102. The Cell Update Confirm message 504 can be sent on SRB0 (not ciphered) or SRB1 (ciphered). If the Cell Update Confirm message 504 is sent on SRB1 the Cell Update Confirm message 504 is ciphered by the UTRAN 105 using a particular ciphering algorithm. Regardless of the SRB that the Cell Update Confirm message 504 is transmitted on, the Cell Update Confirm message 504 is integrity protected according to a particular integrity algorithm. That is, the integrity algorithm used by the UTRAN 105 will output an integrity message MAC-1 which is appended to the Cell Update Confirm message 504.

At step S408 the UE 102 receives the Cell Update Confirm message 504 from the UTRAN 105.

At step S409, the UE 102 determines if the Cell Update Confirm message 504 was received from the UTRAN 105 on SRB1. If the Cell Update Confirm message 504 was received from the UTRAN 105 on SRB1 then the process proceeds to step S410 and step S412.

In step S410, the UE 102 deciphers the ciphered Cell Update Confirm message 504 using an original ciphering algorithm. The use of the term "original" here denotes the ciphering algorithm that the UE 102 was arranged to use for handling data transmissions to and from the UTRAN 105 before the UE 102 received the Security Mode Command message 112 from the UTRAN 105 with an indication of a new ciphering algorithm to be used.

Following deciphering at step S410, the deciphered Cell Update Confirm message is delivered to the RRC layer 307 at the UE 102 and the process proceeds to step S414.

At step S412, the UE 102 deciphers the ciphered Cell Update Confirm message 504 using the new but aborted ciphering algorithm that was received from the UTRAN 105 in the Security Mode Command message 112. The deciphered Cell Update Confirm message is delivered to the RRC layer 307 at the UE 102 and the process proceeds to step S416

At step S414, the UE 102 attempts to verify the integrity of the deciphered Cell Update Confirm message using the original integrity algorithm. That is, on receiving the deciphered Cell Update Confirm message at the RRC layer 307 the UE 102 is arranged to generate an expected integrity message XMAC-1 and compare it to the MAC-1 received appended to the Cell Update Confirm message 504. If it is determined at step S414 that the expected integrity message XMAC-1 generated using the original integrity algorithm matches the MAC-1 received appended to the Cell Update Confirm message 504, then the security configuration comprised of the original ciphering algorithm and the original integrity algorithm is detected by the UE 102. That is, the UE 102 detects that UTRAN is arranged to handle communications with the UE 102 in accordance with the security configuration comprised of the original ciphering algorithm and the original integrity algorithm.

At step S416, the UE 102 attempts to verify the integrity of the deciphered Cell Update Confirm message 504 using the new but aborted integrity algorithm. That is, on receiving the deciphered Cell Update Confirm message at the RRC layer 307 the UE 102 is arranged to generate an expected integrity message XMAC-1 using the new but aborted integrity algorithm and compare it to the MAC-1 received appended to the Cell Update Confirm message 504. If it is determined at step S416 that the expected integrity message XMAC-1 generated using the new but aborted integrity algorithm matches the MAC-1 received appended to the Cell Update Confirm message 504, then the security configuration comprised of the new ciphering algorithm and the new integrity algorithm is detected by the UE 102. That is, the UE 102 detects that UTRAN is arranged to handle communications with the UE 102 in accordance with the security configuration comprised of the new ciphering algorithm and the new integrity algorithm.

It will be appreciated from the above that only one of the attempts at integrity verification at steps S414 and S416 will succeed. That is for one of the security configurations, the expected integrity message XMAC-1 generated using the integrity algorithm will not match the MAC-1 received appended to the Cell Update Confirm message.

Following completion of steps S414 and S416, the UE 102 will have detected which security configuration to use (either the original security configuration comprising the original ciphering algorithm and original algorithm, or the new but aborted security configuration comprising the new but aborted ciphering algorithm and the new but aborted integrity algorithm) for transmission and receipt of data to and from the UTRAN 105.

Figure 4A:
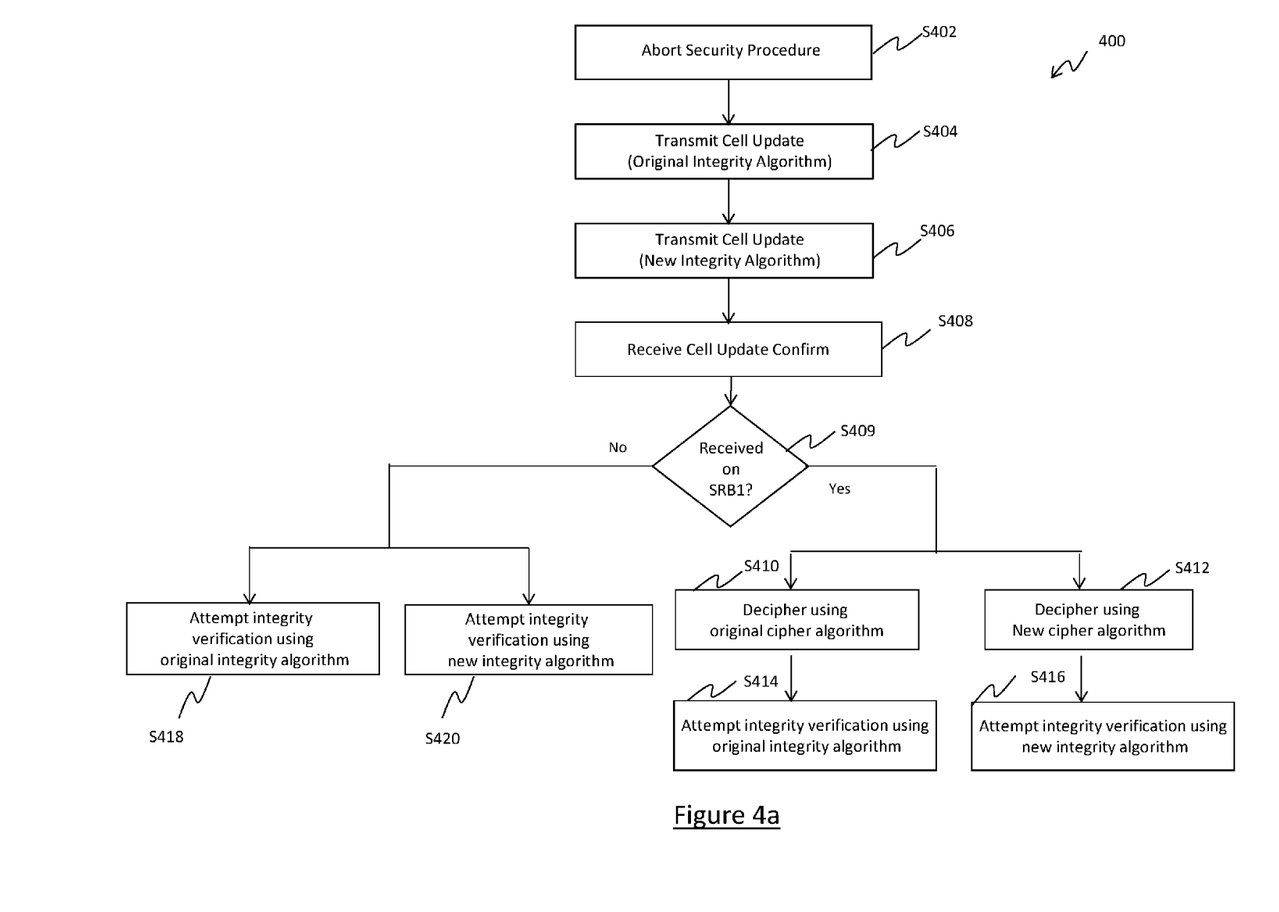
FIG. 4a is a flowchart of a process for performing a cell update procedure.
Figure 5A:
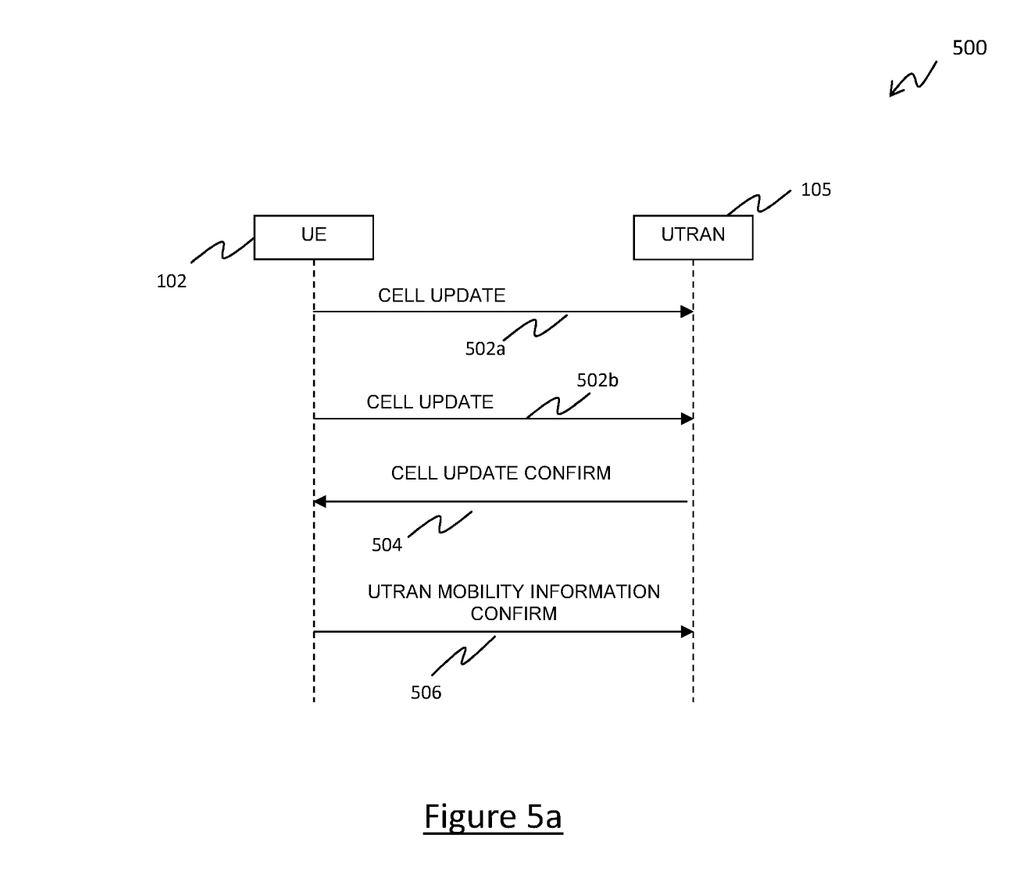
FIG. 5a shows a cell update procedure.

In the embodiments described herein with reference to FIGS. 4a and 5a, if the Cell Update Confirm message 504 was received from the UTRAN 105 on SRB1, the UE 102 tries both sets of security parameters in a cell update procedure i.e. both the original ciphering and integrity algorithms, and the new but aborted ciphering and integrity algorithms. When the UE 102 receives a Cell Update Confirm message from the radio access network on SRB1, it must test both the original ciphering and integrity algorithms, and the new but aborted ciphering and integrity algorithms. Whichever security configuration succeeds can then be used normally.

Referring back to step S409, if the Cell Update Confirm message 504 was not received from the UTRAN 105 on SRB1 i.e. the Cell Update Confirm message 504 was received from the UTRAN 105 on SRB0, then the process proceeds to step S418 and step S420.

At step S418, the UE 102 attempts to verify the integrity of the unciphered Cell Update Confirm message using the original integrity algorithm. That is, on receiving the unciphered Cell Update Confirm message at the RRC layer 307 the UE 102 is arranged to generate an expected integrity message XMAC-1 and compare it to the MAC-1 received appended to the unciphered Cell Update Confirm message 504. For SBR0 detecting which integrity configuration is used in the Cell Update Confirm message is sufficient to detect the entire security configuration. If it is determined at step S418 that the expected integrity message XMAC-1 generated using the original integrity algorithm matches the MAC-1 received appended to the Cell Update Confirm message 504, then the security configuration comprised only of the original integrity algorithm (no ciphering) is detected by the UE 102. That is, the UE 102 detects that UTRAN is arranged to handle communications with the UE 102 in accordance with a security configuration comprised only of the original integrity algorithm (no ciphering).

At step S420, the UE 102 attempts to verify the integrity of the unciphered Cell Update Confirm message using the new but aborted integrity algorithm. That is, on receiving the unciphered Cell Update Confirm message at the RRC layer 307 the UE 102 is arranged to generate an expected integrity message XMAC-1 and compare it to the MAC-1 received appended to the unciphered Cell Update Confirm message 504. For SBR0 detecting which integrity configuration is used in the Cell Update Confirm message is sufficient to detect the entire security configuration. If it is determined at step S420 that the expected integrity message XMAC-1 generated using the new but aborted integrity algorithm matches the MAC-1 received appended to the Cell Update Confirm message 504, then the security configuration comprised only of the new but aborted integrity algorithm (no ciphering) is detected by the UE 102. That is, the UE 102 detects that UTRAN 105 is arranged to handle communications with the UE 102 in accordance with a security configuration comprised only of the new but aborted integrity algorithm (no ciphering).

Following completion of steps S418 and S420, the UE 102 will have detected which security configuration to use (either the original security configuration comprising the original algorithm, or the new but aborted security configuration comprising the new the new but aborted integrity algorithm) for transmission and receipt of data to and from the UTRAN 105.

In the embodiments described herein with reference to FIGS. 4a and 5a, if the Cell Update Confirm message 504 was received from the UTRAN 105 on SRB0, the UE 102 tries both the original integrity algorithm, and the new but aborted integrity algorithm. When the UE 102 receives a Cell Update Confirm message from the radio access network on SRB0, it must test both the original integrity algorithms, and the new but aborted integrity algorithms. Whichever security configuration succeeds can then be used normally.

The detected security configuration is then used by the UE 102 to complete the cell update procedure. That is, the UE 102 is arranged to transmit a UTRAN Mobility Information Confirm message 506 to the UTRAN 105 using the detected security configuration. The detected security configuration is also used for on-going operation of the RRC layer 307 and the second layer (L2) (i.e. the MAC layer 303 and RLC layer 305).

In one embodiment, the contents of the Cell Update message 502a are the same as the Cell Update message 502b. In an alternative embodiment, the information elements (IE) of the Cell Update message 502a include different contents to the information elements (IE) of the Cell Update message 502b. This will avoid compromising the security of the integrity protection by sending the same data twice. For example, the RACH transport channel can be used for measurement reporting and measurement result information is configured to be included in a Cell Update message, thus the 'Measured results on RACH' IE in the Cell Update message 502a may include different information to the 'Measured results on RACH' IE in the Cell Update message 502b. It will be appreciated that this is merely an example of one type of information element whose content may differ between the Cell Update message 502a and the Cell Update message 502b, other information elements may include content which differs between the Cell Update message 502a and the Cell Update message 502b.

Figure 4B:
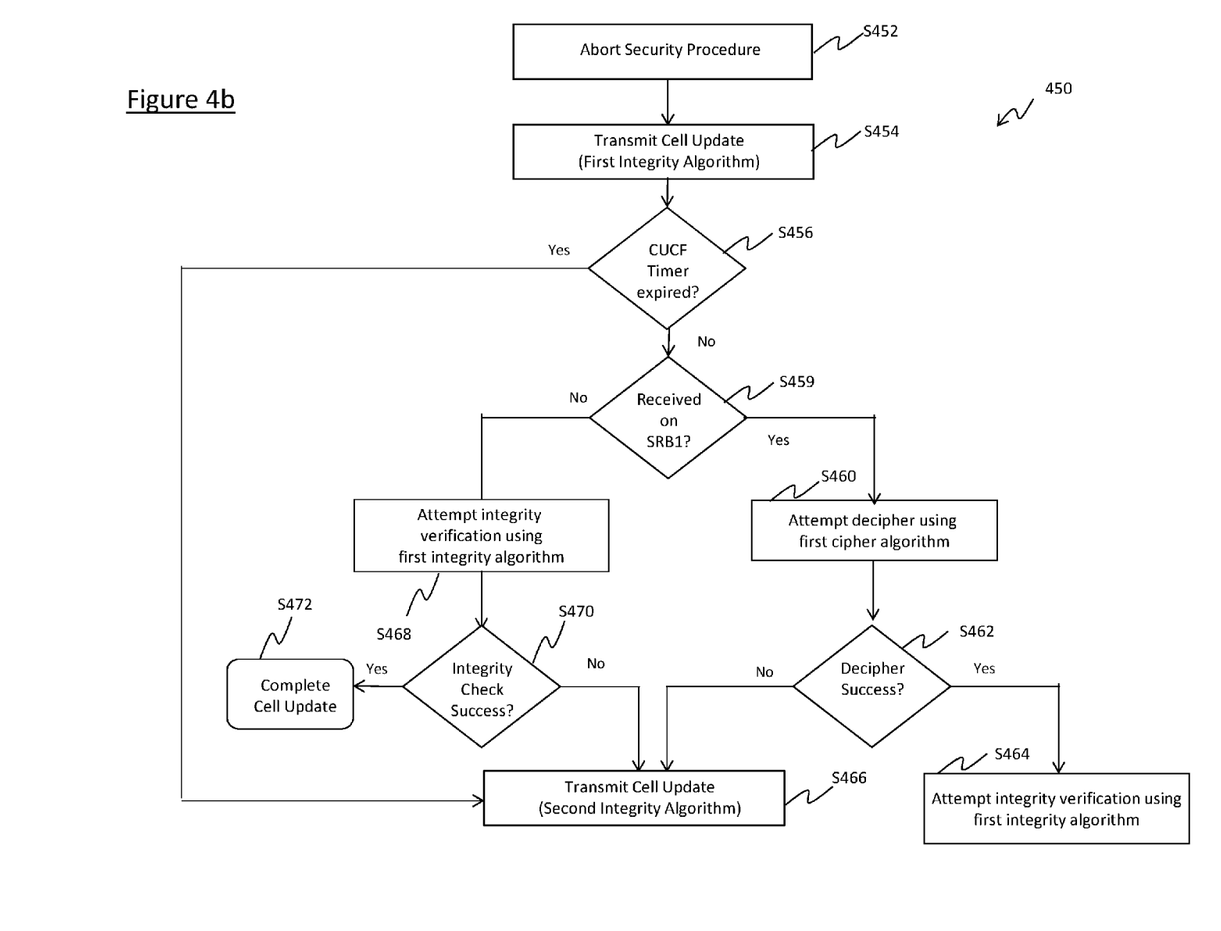
FIG. 4b is a flowchart of a process for performing a cell update procedure.
Figure 5B:
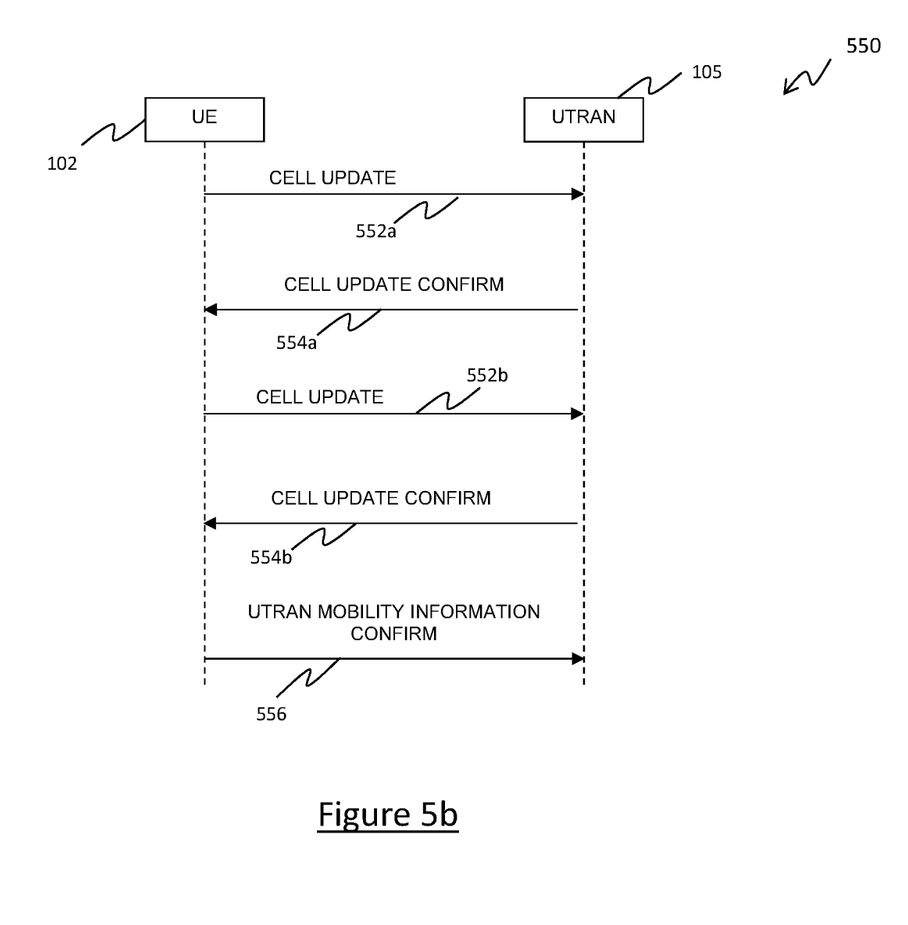
FIG. 5b shows a cell update procedure.

Another embodiment for handling of a cell update procedure initiated after the UTRAN 105 has transmitted the acknowledgement 118 during the security procedure of FIG. 1 will now be described with reference to FIGS. 4b and 5b.

In step S452, a cell update procedure is triggered at the UE 102 and causes the UE 102 to abort the security procedure of FIG. 1.

In step S454, the UE 102 transmits a first Cell Update message to the UTRAN 105 using a first integrity algorithm. The first integrity algorithm may be the original integrity algorithm that the UE 102 was arranged to use for handling data transmissions to and from the UTRAN 105 before the UE 102 received the Security Mode Command message 112 from the UTRAN 105 with an indication of a new integrity algorithm to be used. Alternatively, first integrity algorithm may be the new but aborted integrity algorithm that was received from the UTRAN 105 in the Security Mode Command message 112.

Regardless of the integrity algorithm used, the integrity algorithm will output an integrity message MAC-1 (Message Authentication Code) which is appended to the Cell Update message 502a. The transmission of the first Cell Update message at step S454 is show in FIG. 5b as Cell Update message 552a. The Cell Update message 552a is sent on CCCH which is not ciphered.

The UTRAN 105 may process the Cell Update message 502a according to the security configuration it has and respond to the Cell Update message 552a by transmitting a Cell Update Confirm message 554a to the UE 102 using this security configuration. It will be apparent from the following description that in this scenario, reception of the Cell Update Confirm message 554a may fail in dependence on the security configuration used by the UTRAN 105 to transmit the Cell Update Confirm message 554a.

The Cell Update Confirm message 554a can be sent on SRB0 (not ciphered) or SRB1 (ciphered). If the Cell Update Confirm message 554a is sent on SRB1 the Cell Update Confirm message 554a is ciphered by the UTRAN 105 using a particular ciphering algorithm. Regardless of the SRB that the Cell Update Confirm message 504 is transmitted on, the Cell Update Confirm message 554a is integrity protected by the UTRAN 105 according to a particular integrity algorithm. That is, the integrity algorithm used will output an integrity message MAC-1 which is appended to the Cell Update Confirm message 554a.

A Cell Update retry timer (T302) is maintained at the UE 102. At step S456 the UE 102 determines if the Cell Update Confirm message 554a is received at the UE 102 before expiry of the timer. If the Cell Update Confirm message 554a is received at the UE 102 before expiry of the timer the process proceeds to step S459.

At step S459, the UE 102 determines if the Cell Update Confirm message 554a was received from the UTRAN 105 on SRB1. If the Cell Update Confirm message 554a was received from the UTRAN 105 on SRB1 then the process proceeds to step S460.

At step S460, the UE 102 attempts to decipher the ciphered Cell Update Confirm message 554a using a first ciphering algorithm.

If the first integrity algorithm used at step S454 to transmit the cell update 552a was the original integrity algorithm then the first ciphering algorithm corresponds to the original ciphering algorithm i.e. the ciphering algorithm that the UE 102 was arranged to use for handling data transmissions to and from the UTRAN 105 before the UE 102 received the Security Mode Command message 112 from the UTRAN 105 with an indication of a new ciphering algorithm to be used.

Alternatively, if the first integrity algorithm used at step S454 to transmit the cell update 552a was the new but aborted integrity algorithm then the first ciphering algorithm corresponds to the new but aborted ciphering algorithm i.e. the ciphering algorithm that was received from the UTRAN 105 in the Security Mode Command message 112.

At step S462, the UE 102 determines if the deciphering performed at step S460 was successful. If the deciphering at step S460 was successful the process proceeds to step S464 where the UE 102 attempts to verify the integrity of the deciphered Cell Update Confirm message 554a using the first integrity algorithm. That is, on receiving the deciphered Cell Update Confirm message at the RRC layer 307 the UE 102 is arranged to generate an expected integrity message XMAC-1 using the first integrity algorithm and compare it to the MAC-1 received appended to the Cell Update Confirm message 504. If it is determined at step S464 that the expected integrity message XMAC-1 generated using the first integrity algorithm matches the MAC-1 received appended to the Cell Update Confirm message 554a, then the security configuration comprised of the first ciphering algorithm and the first integrity algorithm is detected by the UE 102. That is, the UE 102 detects that UTRAN is arranged to handle communications with the UE 102 in accordance with the security configuration comprised of the first ciphering algorithm and the first integrity algorithm. The UE 102 is arranged to complete the Cell Update procedure by transmitting a UTRAN mobility Information Confirm message 556 using the detected security configuration.

Referring back to step S459, if the UE 102 determines that the Cell Update Confirm message 554a was not received from the UTRAN 105 on SRB1 i.e. the Cell Update Confirm message 554a was received from the UTRAN 105 on SRB0, then the process proceeds to step S468.

At step S468, the UE 102 attempts to verify the integrity of the unciphered Cell Update Confirm message using the first integrity algorithm. That is, on receiving the unciphered Cell Update Confirm message at the RRC layer 307 the UE 102 is arranged to generate an expected integrity message XMAC-1 and compare it to the MAC-1 received appended to the unciphered Cell Update Confirm message 554a. If it is determined at step S470 that the expected integrity message XMAC-1 generated using the first integrity algorithm matches the MAC-1 received appended to the Cell Update Confirm message 554a, then the process proceeds to step S472 where the security configuration comprised of the first integrity algorithm (no ciphering) is detected by the UE 102. That is, the UE 102 detects that the UTRAN 105 is arranged to handle communications with the UE 102 in accordance with a security configuration comprised of the first integrity algorithm (no ciphering). The UE 102 is arranged to complete the Cell Update procedure by transmitting a UTRAN mobility Information Confirm message 556 using the detected security configuration.

If the UE 102 determines at step S462 that there is a ciphering failure (on SRB1) or at step S470 that there is an integrity protection failure (on SRB0), then the process proceeds to step S466. At step S466 the UE 102 initiates a Cell Update retry procedure in the normal way according to the 3GPP 25.331 specification. The security parameters for the Cell Update retry are changed to a second configuration. That is, at step S466, the UE 102 transmits a second Cell Update message 552b to the UTRAN 105 using a second integrity algorithm.

If the first integrity algorithm used to transmit the first Cell Update 552a corresponds to the original integrity algorithm that the UE 102 was arranged to use for handling data transmissions to and from the UTRAN 105 before the UE 102 received the Security Mode Command message 112 from the UTRAN 105 with an indication of a new integrity algorithm to be used, then the second integrity algorithm corresponds to the new but aborted integrity algorithm that was received from the UTRAN 105 in the Security Mode Command message 112.

Similarly, if the first integrity algorithm used to transmit the first Cell Update 552a corresponds to the new but aborted integrity algorithm that was received from the UTRAN 105 in the Security Mode Command message 112, then the second integrity algorithm corresponds to the original integrity algorithm that the UE 102 was arranged to use for handling data transmissions to and from the UTRAN 105 before the UE 102 received the Security Mode Command message 112 from the UTRAN 105 with an indication of a new integrity algorithm to be used.

The UE 102, is then arranged to attempt to complete the Cell Update procedure by receiving the Cell Update Confirm message 554b from the UTRAN 105 and transmitting the UTRAN Mobility Information Confirm message 556 to the UTRAN 105 using the second integrity algorithm and a second ciphering algorithm (if Cell Update Confirm message 554b was received on SRB1 (ciphered).

If the first ciphering algorithm used to decipher the Cell Update Confirm message 554a corresponds to the original ciphering algorithm that the UE 102 was arranged to use for handling data transmissions to and from the UTRAN 105 before the UE 102 received the Security Mode Command message 112 from the UTRAN 105 with an indication of a new ciphering algorithm to be used, then the second ciphering algorithm corresponds to the new but aborted ciphering algorithm that was received from the UTRAN 105 in the Security Mode Command message 112.

Similarly, if the first ciphering algorithm used to decipher the Cell Update Confirm message 554a corresponds to the new but aborted ciphering algorithm that was received from the UTRAN 105 in the Security Mode Command message 112, then the second ciphering algorithm corresponds to the original ciphering algorithm that the UE 102 was arranged to use for handling data transmissions to and from the UTRAN 105 before the UE 102 received the Security Mode Command message 112 from the UTRAN 105 with an indication of a new ciphering algorithm to be used.

Referring back to step S456, if the Cell Update Confirm message 554a is not received at the UE 102 before expiry of the timer the process proceeds to step S466 described above, The UTRAN 105 may not process the Cell Update message 502a (if the security configuration it has does not correspond to the first integrity algorithm used by the UE 102 to transmit the Cell Update message 552a). In this scenario, the UTRAN 105 does not transmit Cell Update Confirm message 554a to the UE 102 and the Cell Update retry timer (T302) maintained at the UE 102 will expire. Upon expiry of this timer in the UE 102 the UE 102 should switch to the alternate security reconfiguration when sending the next Cell Update (as it would if the Cell Update Confirm security configuration had not been received).

It may be the case that the Cell Update Confirm message 554a is not received at the UE 102 for other reasons well known to persons skilled in the art (typically bad radio conditions). This will cause expiry of the timer maintained at the UE 102. The UE 102 is required to keep retrying between the different security configurations. The pattern of the switching between the configurations is not important, simply that both are tried.

Figure 6:
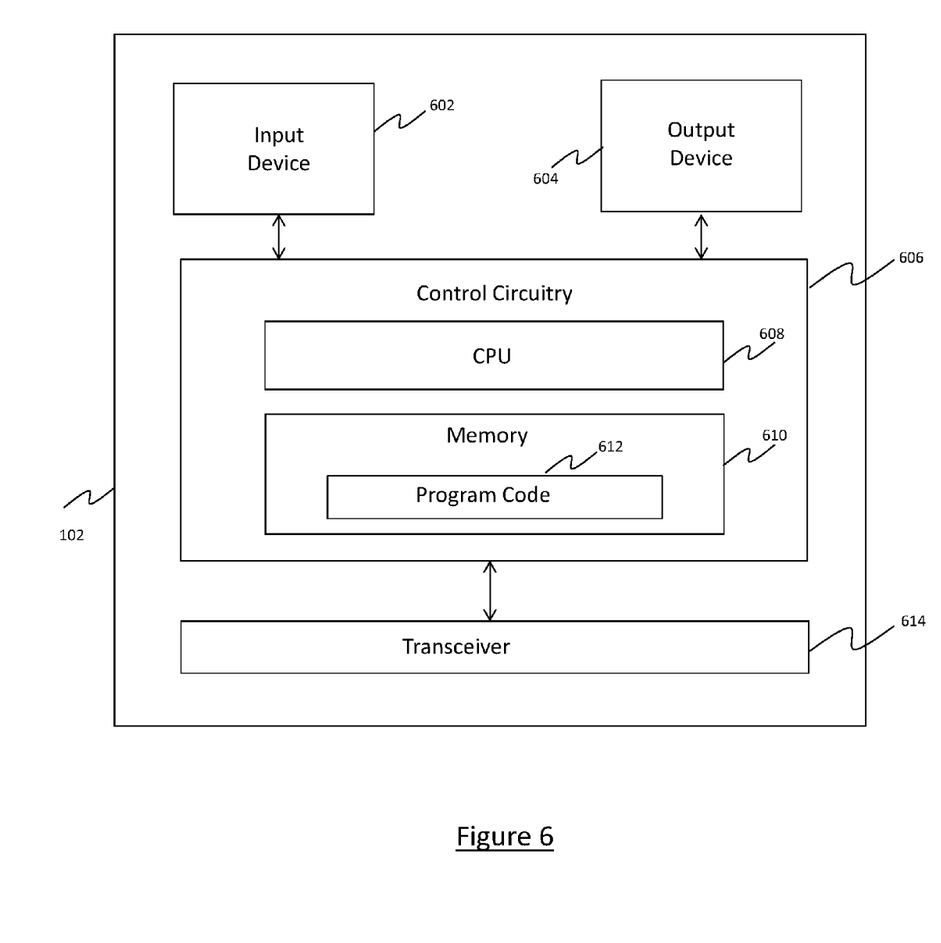
FIG. 6 is a block diagram of user equipment.

FIG. 6 is a functional block diagram of a UE 102 according to the present invention. For simplicity, FIG. 6 only shows an input device 602, an output device 604, a control circuit 606, a central processing unit (CPU) 608, a memory 610, program code 612, and a transceiver 614 of the UE 102. The UE 102 can receive signals input by a user of the UE 102 through the input device 602, such as a keyboard, and can output images and sounds through the output device 604, such as a display or speakers. The transceiver 614 is used to receive and transmit wireless signals, deliver received signals to the control circuit 606, and output signals generated by the control circuit 606 wirelessly. In the UE 102, the control circuit 606 executes the program code 612 stored in the memory 610 through the CPU 608, thereby controlling an operation of the UE 102. The features of the techniques described below are platform-independent, meaning that the techniques may be implemented on a variety of commercial computing platforms having a variety of processors. The program code 612 can be stored in one or more computer readable memory devices. The memory 610 may be volatile memory such as RAM or non-volatile memory such as flash (EEPROM). The memory 610 may be a component of the UE's circuitry or may be on machine-readable media, examples of which are well known in the art. Referring back to the UMTS radio interface protocol architecture 200 shown in FIG. 2, the transceiver 614 can be seen as a portion of Layer 1, and the control circuit 206 can be utilised to realise functions of Layer 2 and Layer 3.

The CPU 608 executes the program code 612 so as to implement the present invention. The steps of one embodiment are detailed above and illustrated in the flowchart 400 of FIG. 4a. The steps of a further embodiment are detailed above and illustrated in the flowchart 450 of FIG. 4b.

Embodiments described herein handle the abort of a Security Mode Command procedure robustly such that the RRC connection between the UE and UTRAN is maintained, which avoids call drops and maintains data connectivity.

Embodiments described herein advantageously only require changes (if required) to the security configuration in the UE (and not the UTRAN) and thus saves signalling resources in the UTRAN, and can be implemented in a UE of any 3GPP release.

Embodiments have been described herein in relation to 3GPP specifications. The method and apparatus described herein are not intended to be limited to the specifications or versions thereof referred to herein but may be applicable to future versions or other specifications.

While this invention has been particularly shown and described with reference to some embodiments, it will be understood to those skilled in the art that various changes in form and detail may be made without departing from the scope of the invention as defined by the appendant claims.

The invention claimed is:

1. A method, in a wireless communications device, of implementing a cell update procedure during a security mode configuration procedure, the method comprising:

receiving a new security mode configuration from a radio access network that is to replace an original security mode configuration as part of said security mode configuration procedure;

detecting, prior to completion of said security mode configuration procedure, that a cell update message is to be sent to the radio access network;

transmitting a first cell update message to the radio access network in accordance with the original security mode configuration;

transmitting a second cell update message to the radio access network in accordance with the new security mode configuration;

receiving a cell update confirm message from the radio access network, the cell update confirm message sent by the radio access network in accordance with a network determined security mode configuration;

ascertaining if the network determined security mode configuration is either the original security mode configuration or the new security mode configuration; and completing the cell update procedure in accordance with the ascertained security mode configuration.

2. A method according to claim 1, wherein the new security mode configuration comprises a new integrity algorithm; and the original security mode configuration comprises an original integrity algorithm.

3. A method according to claim 2, wherein the new security mode configuration additionally comprises a new ciphering algorithm, and the original security mode configuration additionally comprises an original ciphering algorithm.

4. A method according to claim 3, wherein the method further comprises:
deciphering the received cell update confirm message using the original ciphering algorithm and testing the integrity of the received cell update confirm message using the original integrity algorithm;
deciphering the received cell update confirm message using the new ciphering algorithm and testing the integrity of the received cell update confirm message using the new integrity algorithm; and
ascertaining the network determined security mode configuration based on one of the integrity tests being successful.

5. The method according to claim 4, wherein the wireless communications device communicates with the radio access network in accordance with a multi-layered communication protocol, the deciphering is performed at a Radio Link Control (RLC) layer or a Medium Access Control (MAC) layer of the multi-layered communication protocol in dependence on a mode of operation of the wireless communications device, and the integrity testing is performed at a Radio Resource Control (RRC) layer of the multi-layered communication protocol.

6. A method according to claim 2, wherein the method further comprises:
testing the integrity of the received cell update confirm message using the original integrity algorithm;
testing the integrity of the received cell update confirm message using the new integrity algorithm; and
ascertaining the network determined security mode configuration based on one of the integrity tests being successful.

7. The method according to claim 6, wherein the wireless communications device communicates with the radio access network in accordance with a multi-layered communication protocol, the integrity testing performed at a Radio Resource Control (RRC) layer of the multi-layered communication protocol.

8. A method according to claim 2, wherein the first cell update message is transmitted to the radio access network in accordance with the original integrity algorithm; and the second cell update message is transmitted to the radio access network in accordance with the new integrity algorithm.

9. A method according to claim 1, wherein the cell update procedure is completed by transmitting a UTRAN Mobility Information Confirm message to the radio access network in accordance with the ascertained security mode configuration.

10. A method according to claim 1, wherein contents of the first cell update message and a second cell update message are identical.

11. A method according to claim 1, wherein contents of the first cell update message are different to the contents of the second cell update message.

12. A method according to claim 11, wherein the first cell update message comprises measurement result information different to that included in the second cell update message.

13. A method according to claim 1, wherein the security mode configuration procedure is implemented according to the Radio Resource Control (RRC) security mode configuration procedure.

14. A method according to claim 13, wherein the new security mode configuration is received from the radio access network in the form of a security mode command message.

15. A method according to claim 1, the method further comprising aborting the security mode configuration procedure in response to transmitting the first cell update message to the radio access network.

16. A computer program product for implementing a cell update procedure during a security mode configuration procedure at a wireless communications device, the computer program product comprising code embodied on a non-transient computer-readable medium and configured so as when executed on a processing apparatus of the wireless communications device to perform the method of claim 1.

17. A wireless communications device arranged to implement a cell update procedure during a security mode configuration procedure, the wireless communications device comprising:
a transceiver arranged to receive a new security mode configuration from a radio access network that is to replace an original security mode configuration as part of the security mode configuration procedure;
a central processing unit; and
a memory coupled to the central processing unit, the memory containing program code executable by the central processing unit causing the central processing unit to perform the following steps:
detect, prior to completion of said security mode configuration procedure, that a cell update message is to be sent to the radio access network;
transmit a first cell update message to the radio access network in accordance with the original security mode configuration;
transmit a second cell update message to the radio access network in accordance with the new security mode configuration;
receive a cell update confirm message from the radio access network, the cell update confirm message sent by the radio access network in accordance with a network determined security mode configuration;
ascertain if the network determined security mode configuration is either the original security mode configuration or the new security mode configuration; and
complete the cell update procedure in accordance with the ascertained security mode configuration.

18. A method, in a wireless communications device, of implementing a cell update procedure during a security mode configuration procedure, the method comprising:
receiving a new security mode configuration from a radio access network that is to replace an original security mode configuration as part of said security mode configuration procedure;
detecting, prior to completion of said security mode configuration procedure, that a cell update message is to be sent to the radio access network;
transmitting a first cell update message to the radio access network in accordance with a first security mode configuration;
determining if a cell update confirm message is received from the radio access network on one of a first and second signalling radio bearer in accordance with a network determined security mode configuration within a predetermined time period from transmission of said first cell update message, wherein if a cell update confirm message is received within said predetermined time period, the method further comprising:

attempting to decipher the received cell update confirm message using the first security mode configuration, or attempting to verify the integrity of the received cell update confirm message using the first security mode configuration, based on the signalling radio bearer on which the cell update confirm message is received;

wherein in the event of failure of the attempted decipher or the integrity verification, the method further comprising:

transmitting a second cell update message to the radio access network in accordance with a second security mode configuration.

19. A method according to claim 18, the method comprising attempting to verify the integrity of the received cell update confirm message using the first security mode configuration if the first signalling radio bearer received the cell update confirm message.

20. A method according to claim 19, wherein the first security mode configuration comprises an original integrity algorithm; and the second security mode configuration comprises a new integrity algorithm.

21. A method according to claim 19, wherein the first security mode configuration comprises a new integrity algorithm; and the second security mode configuration comprises an original integrity algorithm.

22. A method according to claim 18, the method comprising attempting to decipher the received cell update confirm message using the first security mode configuration if the second signalling radio bearer received the cell update confirm message.

23. A method according to claim 22, wherein the first security mode configuration comprises an original ciphering algorithm, and the second security mode configuration comprises a new ciphering algorithm.

24. A method according to claim 22, wherein the first security mode configuration comprises a new ciphering algorithm, and the second security mode configuration comprises an original ciphering algorithm.

25. A method according to claim 18, wherein the first signalling radio bearer (SRB) corresponds to SRB0 defined in the 3GPP 25.331 technical specification and the second signalling radio bearer corresponds to SRB1 defined in the 3GPP 25.331 technical specification.

26. A method according to claim 18, wherein the wireless communications device communicates with the radio access network in accordance with a multi-layered communication protocol, and the attempt to verify the integrity of the received cell update confirm message is performed at a Radio Resource Control (RRC) layer of the multi-layered communication protocol.

27. A method according to claim 18, wherein the wireless communications device communicates with the radio access network in accordance with a multi-layered communication protocol, and the attempt to decipher the received cell update confirm message is performed at a Radio Link Control (RLC) layer or a Medium Access Control (MAC) layer of the multi-layered communication protocol in dependence on a mode of operation of the wireless communications device.

28. A method according to claim 18, wherein if a cell update confirm message is not received within said predetermined time period, the method further comprising: transmitting the second cell update message to the radio access network in accordance with the second security mode configuration.

29. A method according to claim 18, wherein the security mode configuration procedure is implemented according to the Radio Resource Control (RRC) security mode configuration procedure.

30. A method according to claim 18, wherein the new security mode configuration is received from the radio access network in the form of a security mode command message.

31. A method according to claim 18, the method further comprising aborting the security mode configuration procedure in response to transmitting the first cell update message to the radio access network.

32. A computer program product for implement a cell update procedure during a security mode configuration procedure at a wireless communications device, the computer program product comprising code embodied on a non-transient computer-readable medium and configured so as when executed on a processing apparatus of the wireless communications device to perform the method of claim 18.

33. A wireless communications device arranged to implement a cell update procedure during a security mode configuration procedure, the wireless communications device comprising:

a transceiver arranged to receive a new security mode configuration from a radio access network that is to replace an original security mode configuration as part of the security mode configuration procedure;

a central processing unit;

a memory coupled to the central processing unit, the memory containing program code executable by the central processing unit causing the central processing unit to perform the following steps:

detect, prior to completion of said security mode configuration procedure, that a cell update message is to be sent to the radio access network;

transmit a first cell update message to the radio access network in accordance with a first security mode configuration;

determine if a cell update confirm message is received from the radio access network on one of a first and second signalling radio bearer in accordance with a network determined security mode configuration within a predetermined time period from transmission of said first cell update message, wherein if a cell update confirm message is received within said predetermined time period, the central processing unit arranged to:

attempt to decipher the received cell update confirm message using the first security mode configuration, or attempt to verify the integrity of the received cell update confirm message using the first security mode configuration, based on the signalling radio bearer on which the cell update confirm message is received; and in the event of failure of the attempted decipher or the integrity verification, transmit a second cell update message to the radio access network in accordance with a second security mode configuration.

* * * * *